Aug. 13, 1957 — I. NIMEROFF ET AL — 2,802,390
SMOKE COLORIMETER
Filed Dec. 2, 1953 — 3 Sheets-Sheet 2
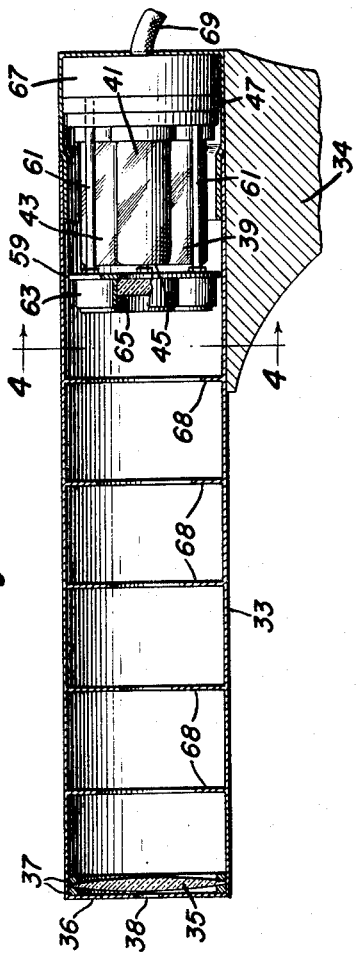
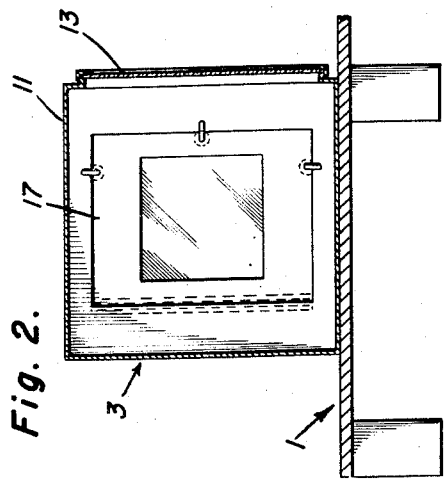
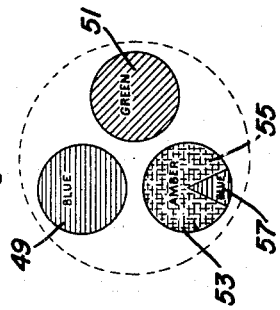
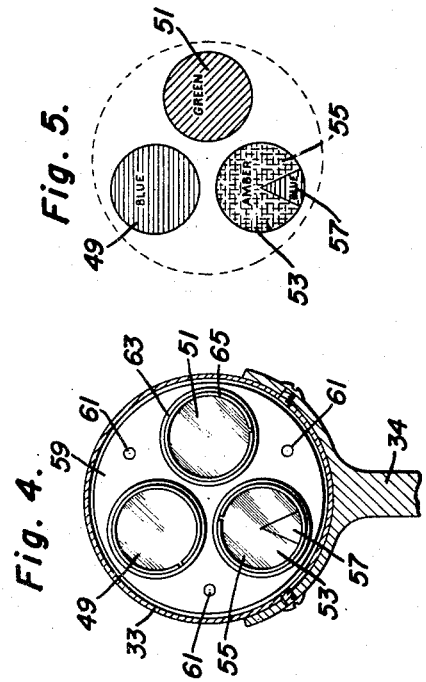
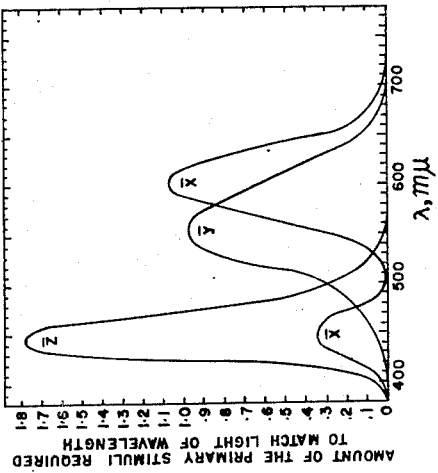
INVENTORS
Isadore Nimeroff
Samuel W. Wilson
By George Renehan
ATTORNEY

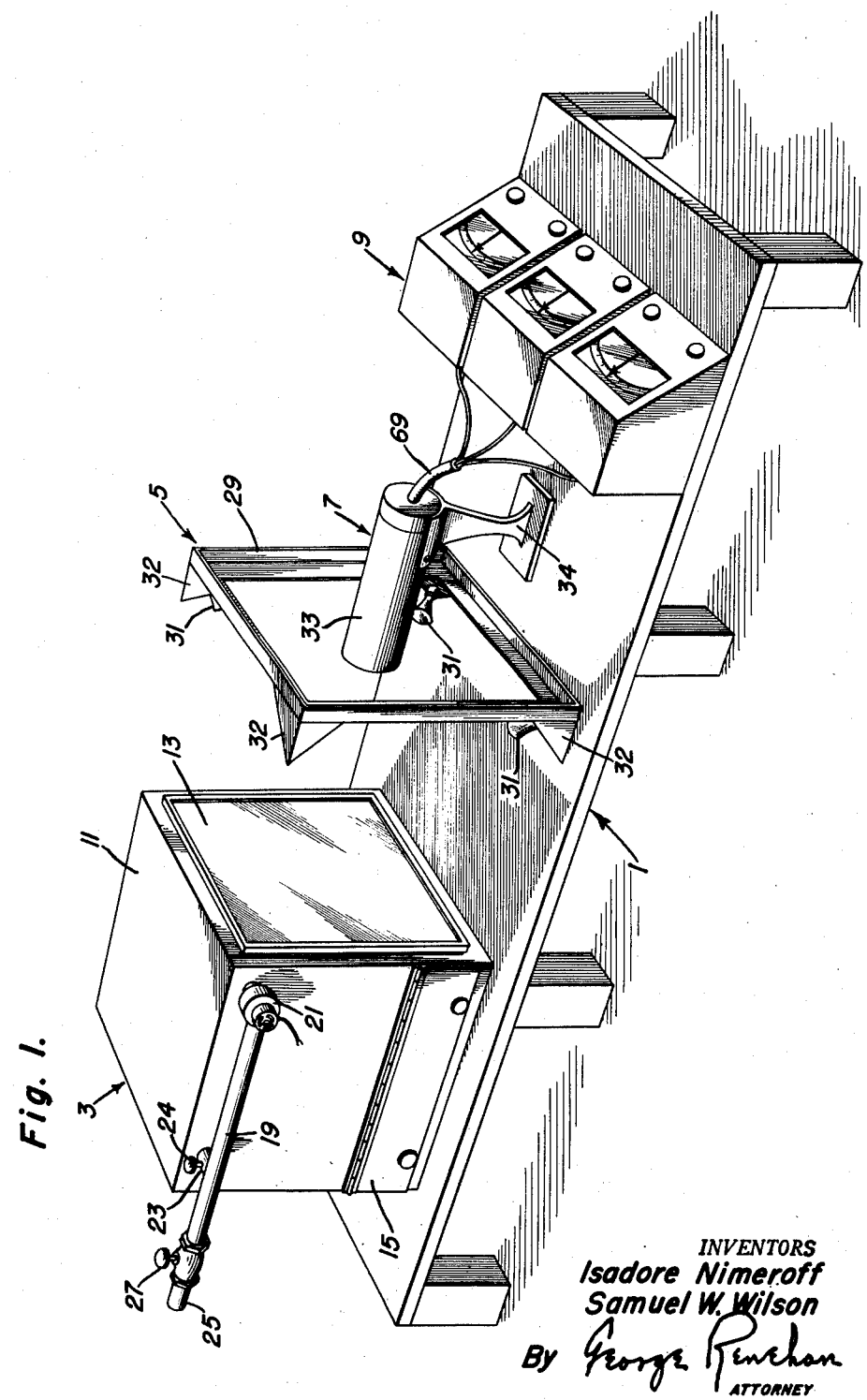

Fig. 6.

INVENTORS
Isadore Nimeroff
Samuel W. Wilson
By George Renehan
ATTORNEY

United States Patent Office 2,802,390
Patented Aug. 13, 1957

2,802,390

SMOKE COLORIMETER

Isadore Nimeroff and Samuel W. Wilson, Washington, D. C., assignors to the United States of America as represented by the Secretary of the Army Application December 2, 1953, Serial No. 395,857

2 Claims. (Cl. 88—14)

(Granted under Title 35, U. S. Code (1952), sec. 266)

The invention described herein may be manufactured and used by or for the Government of the United States of America for governmental purposes without the payment to us of any royalty thereon.

This invention relates to a photoelectric colorimeter for measuring the color of smokes. Certain aspects of the invention are applicable to photoelectric tristimulus colorimetry in general.

An object of the invention is to provide a photoelectric colorimeter which will permit the accurate measurement of the color of a smoke sample.

A further object of our invention is to provide a three-tube photoelectric colorimeter which will more accurately reproduce the three functions of the CIE Standard Observer than has hitherto been the case.

In the drawings, Figure 1 is a perspective view of our colorimeter as a whole.

Figure 2 is a longitudinal section of the smoke box.

Figure 3 is a longitudinal section of the viewing system.

Figure 4 is a transverse section taken on line 4—4 of Figure 3.

Figure 5 is a diagrammatic view showing the colors of the filters.

Figure 6 is a circuit diagram of one of the meters.

Figure 7 is a graph showing the spectral functions of the CIE "Standard Observer."

Photoelectric tristimulus colorimeters for measuring colors in terms of the CIE (International Commission on Illumination) spectral functions have been known for a number of years. A discussion of their principles and mode of operation is contained in Bureau of Standards Circular C429, "Photoelectric Tristimulus Colorimetry with Three Filters," July 30, 1942.

These colorimeters employ three phototubes, each phototube being combined with a colored filter. The filters are selected in accordance with the CIE definition of the "Standard Observer." This definition consists of three functions of wave length λ (lambda), showing the relative amounts ($\bar{x}\lambda$, $\bar{y}\lambda$, $\bar{z}\lambda$) of three primary stimuli required to color-match the various parts of the equal energy spectrum. The values of the functions are shown in Figure 7. A tristimulus designation of the color of a sample consists in the amounts (such as X, Y, Z) of the three stimuli required to produce a color match for it.

Ideally, each filter-phototube combination should be such that its response would be proportional throughout the visible spectrum to one of the curves of Figure 7. In practice, this is difficult to attain. One particular difficulty will be apparent from a study of the $\bar{x}$ curve. It will be noted that this curve has two lobes; a major lobe in the red portion of the spectrum and a minor lobe in the blue portion. Various expedients have been used in the past to overcome the difficulty caused by this characteristic of the $\bar{x}$ curve. In some cases a portion of the Z reading has been added to the X reading, either by sending an attenuated portion of the Z response to the X indicator, or as a part of the calculations. In other cases, the system has been complicated by the use of additional filter-phototube combinations. As one aspect of our invention, we have succeeded in closely approximating the $\bar{x}$ function by employing a phototube having a circular sensitive element in combination with a circular sectored filter, one sector having an amber color and the other a blue color and giving, in combination with the phototube, the response of the red lobe and blue lobe respectively. This gives a close approximation of the desired results while keeping the circuits simple and making possible the use of commercially available measuring instruments.

Another aspect of our invention is concerned with the arrangement of apparatus for viewing smoke. We utilize a relatively large cubical box having a transparent wall which is evenly illuminated from the exterior. A smoke bomb or other device for liberating a sample of smoke is placed in the box. A fan serves to aid in distributing the smoke. A lens, having a field of view relatively small compared to the dimensions of the box, projects light reflected through the transparent wall on a bank of three phototubes positioned with their sensitive elements in a plane behind the lens. By the use of head-on type multiplier phototubes a compact and efficient photo-sensitive system is produced. As the colors of pyrotechnic smokes are highly saturated, their reflectance is quite low in one spectral region and high in another. The colorimeter requires highly sensitive photometers and phototubes to evaluate this wide reflectance range with equal precision. Each phototube is separtely connected to a highly sensitive photometer circuit of a known type.

Our apparatus will now be described. Referring to Figure 1, the colorimeter may include base 1 on which is mounted a smoke box 3, an illuminating system 5, a viewing system 7, and meters 9. The smoke box is in the form of a cubical box 11 provided with a transparent wall 13. Access is provided by doors 15 and 17. A circulating system is provided which includes a conduit 19 and a blower 21. An inlet connection 23 provided with a damper 24 leads from the conduit to the box. The blower operates in such a manner as to withdraw air from the box and circulate it through conduit 19 and inlet connection 23. An outlet connection 25 provided with a valve 27 serves to exhaust smoke from the box at the conclusion of the test.

The illuminating system comprises a frame 29 having dimensions similar to those of the smoke box and spaced from the transparent side by a distance approximately equal to those dimensions. Four flood lamps 31 provided with brackets 32 are mounted on the frame. They are positioned at angles of approximately 45° to the plane of the frame and serve to evenly illuminate transparent wall 13.

The viewing system, which is shown in Figures 3, 4, and 5, includes a tubular housing 33 preferably formed of metal such as brass. The tube is supported on a standard 34. A lens 35 is mounted in one end of the tube by means of retaining rings 37 and is covered by a diaphragm 36 having an aperture 38. The flood lamps 31 and aperture 38 are so selected as to give a suitable intensity of light on the photocathodes of the phototubes. At the other end of the tube is a group of three phototubes 39, 41, and 43. These tubes are of the head-on multiplier type and are substantially cylindrical in form. Each has a semi-transparent photocathode on the inside surface of its end wall 45. The tube which we have employed is described in detail in the bulletin entitled "5819 Multiplier Phototube," copyright 1949 by the Radio Corporation of America and obtainable from the Tube Department, Radio Corporation of America, Harrison, New Jersey. The tubes are mounted in suitable sockets provided in base 47. In front of each of the phototubes is one of the three colored filters 49, 51, and 53. These filters are so selected as to give, in combination with the light sources and the phototubes, CIE functions $\bar{z}$, $\bar{y}$, and $\bar{x}$, respectively. As indicated in Figure 5, the Z filter 49 is blue and the Y filter 51 is green. The X filter 53 is formed of two sectors, an amber sector 55 and a blue sector 57. The design of the filters will be described in more detail later in the specification. The filters are supported on a filter holder 59 which is supported on posts 61 connected to base 47. The individual filters are mounted in housing rings 63 and are held in place by snap rings 65.

Stray light baffles 68 are mounted between the lens 35 and the filters.

As the smokes are translucent media, light scattering as well as transmitting and reflecting, a smoke chamber which is large as compared with the field of view of the lens and which has a uniformly illuminated window is required to minimize edge effect resulting from translucency. We have utilized a chamber which was a three foot cube with a clear glass window 13, approximately the total area of one of the faces of the cube. The lens had a diameter of approximately 5 inches and a focal length of 20 inches. The diameter of aperture 38 was about one inch. The lens was placed about 35 inches from the window 13 and the distance from the lens to the photocathodes was about 21 inches.

The resistors for the multiplier phototubes are inclosed in resistor box 67. The output of each phototube is transmitted to one of the meters 9 through cable 69. The meters 9 which we have employed are of a known type described in "Photovolt Multiplier Photometer Model 520–m, Operating Instructions" issued by the Photovolt Corporation, 95 Madison Avenue, New York 16, New York. The circuit diagram of one of these meters and its associated phototube is shown in Figure 6 on which tube types and values of resistances have been shown.

Light falling on the photosensitive component (cathode) of the multiplier phototube, produces an electrical current which is amplified by the dynode stages of the phototube. This amplified current passes through the range selector stage where a desired fraction (1, 1/10, 1/100, or 1/1000) of the current is directed toward the control and balancing stages. The disparity between the outputs of the control and balancing amplifier tubes is evidenced in the indicating meter by a flow of current proportional to the disparity, which in turn is proportional to the light falling on the cathode of the phototube.

The circuit will now be described in more detail. The electric circuit is built around multiplier phototube 101 having a photocathode 103, dynodes 105 connected through resistors 107 and an anode 109. Included in the circuit is a voltage control stage indicated generally at 111. This circuit includes four voltage regulating tubes 113, 115, 117, and 119. Tubes 113, 115, and 117, connected in series, maintain a drop of 375 volts and control the potential applied to the dynode circuit. Tube 119 maintains a drop of 105 volts and controls the potential applied to the plate circuits of the electron tubes of the two-stage amplifying system. All four tubes in series maintain a drop of 480 volts and control the potential applied to the anode circuit of the phototube.

Current is supplied to tubes 113, 115, and 117 by a full wave rectifier 121 which is connected to a center-tapped transformer 123. The current is smoothed out by a filter circuit comprising condensers 125 and inductor 127. Current is supplied to tube 119 by a half-wave rectifier 129 which in turn is supplied by auto-transformer 131. The current is smoothed by a filter circuit comprising condensers 132 and inductor 134. Current is supplied to the entire system through constant voltage transformer 136.

A range selector indicated generally by 133 determines the proportion of the phototube output current which is delivered to the amplifying stages. This range selector comprises two sets of resistances 135 and 137 controlled by rheostats 139 and 141, respectively. Rheostat 139 is grounded as indicated at 143. By suitable adjustments, a desired proportion of the phototube output may be delivered to the control grid of the control tube 145. This tube is mounted in parallel with balancing tube 147 in the manner shown. The plates of tubes 145 and 147 are coupled directly to the control grids of tubes 149 and 151, respectively. Tubes 149 and 151 are cathode-loaded by the indicating meter 153 which includes a sensitivity control 155. The meter is controlled by a switch 157 and the tubes 149 and 151 are protected by a thermal switch 159.

Transformers 161 and 163 supply the filament currents for the various tubes as indicated by "x" and "y" respectively.

The design of the filters is as follows:

The colorimetric spectral functions, approximated in this colorimeter by combined source-filter-phototube response, are those established by the International Commission on Illumination (CIE). But, as spectral response differs between phototubes, spectral transmission of filters must be designed for each phototube.

The theory of the design of the filters is based on two propositions: that the three CIE observer functions represent the colorimetric system of the average normal observer, and that each of these functions can be approximated by proper selection of optical filters in combination with a light source and a phototube. When the instrument is intended to evaluate the color of non-fluorescent smokes as if they were viewed in daylight (6500° K.), even though in the colorimeter they are illuminated by incandescent lamp light (2800° K.), the proper correction is built into the filter design. If the colorimeter is intended to evaluate the color of fluorescent, as well as non-fluorescent, smokes as viewed under daylight, the approximation of the CIE function will be accomplished by the phototube-filter combination alone, but the illuminator is required to yield artificial daylight.

The CIE spectral response functions, $\bar{x}$, $\bar{y}$, and $\bar{z}$, under daylight spectral conditions, $E_v$, are respectively, $\bar{x}E_v$, $\bar{y}E_v$, and $\bar{z}E_v$. If the illuminator yields spectral distribution, $E_i$, the spectral responses, $S_x$, $S_y$, and $S_z$, of the phototubes for each of these functions must be altered by filters having spectral transmittances, $T_x$, $T_y$, and $T_z$, respectively, in order to refer to viewing by daylight. This condition may be stated mathematically:

$$E_i S_x T_x K_x = \bar{x}E_v, \quad E_i S_y T_y K_y = \bar{y}E_v$$

and $$E_i S_z T_z K_z = \bar{z}E_v \qquad (1)$$

wher $K_x$, $K_y$, and $K_z$ are proportionality constants, independent of wavelength, for their respective functions. The desired relative spectral transmittances then are determined by solving Equations 1 for $K_x T_x$, $K_y T_y$ and $K_z T_z$.

The filter design is accomplished by determining the proper combination of colored glasses. Where the transmittance $T_0$, of a glass stock thickness, $t_0$, is to be changed to a transmittance, $T_1$, of thickness, $t_1$, the following relationship must be solved:

$$T_1 = (T_0^{t_1/t_0})(k^2)^{1-(t_1/t_0)} \qquad (2)$$

where $k$ is unity minus the Fresnel reflectance of the glass. The approximate value of $k$ for glass is 0.96. To facilitate this computation a thickness-transmittance nomograph may be used. (See, for example, "Glass Color Filters by Corning," published by Corning Glass Works, copyright 1948.)

As no combination of glasses has ever achieved complete duplication of the bi-model $x$-function in a single filter, the filter is constructed of two sectors, one to approximate the blue lobe and the other to approximate the red lobe of the $x$-function. This sector arrangement assumes that the response of the photosensitive surface is radially uniform, and precautions are taken to superimpose the center of the filter over the center of the photosensitive surface.

Due to the circular shape of the photocathode and filter, and the sector-type division of the filter, it is not necessary that the response be uniform in all directions and in all parts of the photocathode. Due to the method of manufacture, the photocathode is most likely to have radial symmetry. Moreover, it is simple to test the tube for necessary uniformity by simply rotating the filter in its plane and noting whether or not the meter reading changes. If the reading is not uniform, one can determine the position at which the best average value is obtained and set the filter in that position. Another expedient which could be used if the cathode were non-uniform in its response would be to rotate the filter in its plane during the test. In general, however, we have found the photocathodes to be sufficiently radially symmetrical to make these expedients unnecessary.

The sector angle $\rho$ (rho) may be computed as follows:

The desired relative transmittance for this filter, $K_xT_x$, is separated into the blue lobe and red lobe as, $$K_xT_x = K_x(T_{xb} + T_{xr}) \tag{3}$$

If the observed transmittances of the filters designed to approximate these lobes are $T_{xb}'$ and $T_{xr}'$, respectively, then to assure that the areas under each of the lobes for the designed filter are in the same proportion as the respective lobes for the desired filter the following conditions must hold:

$$\Sigma K_{xb}T_{xb}' = \Sigma K_xT_{xb}$$
$$\Sigma K_{xr}T_{xr}' = \Sigma K_xT_{xr} \tag{4}$$

and $$\rho = K_{xb} \times 360° \ (K_{xr} + K_{xb}) \tag{5}$$

For one particular tube and the associated filter which we have employed $K_{xb}=0.914$, $K_{xr}=5.485$, and $\rho=51°$. In this case the blue sector was formed of 7.5 mm. of Corning glass code number 5433 and 1 mm. of Corning glass code number 3389 while the amber sector was formed of 3 mm. of Corning glass code number 9788 and 6 mm. of Corning glass code number 3304. (See "Glass Color Filters by Corning," cited above.)

While our filter-phototube combination duplicates the CIE functions more accurately than previous photoelectric colorimeters, the duplication is not perfect. Best results are therefore obtained by calibrating the colorimeter with standards having spectral selectivities similar to those of the smokes. In the absence of spectral data for the smokes, satisfactory colorimetry may be achieved by using standards having colors similar to those of the smokes investigated. For this purpose we have used Munsell color charts (see "The Munsell Book of Color," published 1929 by the Munsell Color Company, 10 East Franklin, St., Baltimore, Md.).

In operation a standard, for example 6 x 9 Munsell paper, having a color similar to that expected from smoke is placed on the inner face of window 13 in such a position that the three phototubes "see" only the standard. To check on this positioning, a sheet of white paper may be moved around the periphery of the standard. If the meter needle of each photometric scale remains reasonably stationary during this check, the standard is properly placed. The sensitivity control 155 for each meter is then adjusted to set the corresponding photometers to read correctly the tristimulus values X, Y, and Z of the standard selected.

The standard is then removed and a sample of smoke introduced. If a smoke grenade is used, it is placed in the chamber near the center of the line at the junction of the floor and the rear wall and the smoke discharged. The blower 21 is then started, damper 24 is opened and valve 27 closed so that the smoke is circulated in the chamber. If smoke leaks out of the seams of the chamber, showing that an excess of smoke is present in the box, valve 27 is opened to sufficient degree to exhaust enough smoke to stop the leakage. Readings of the tristimulus values as given by the meters 9 are begun when uniform distribution of the smoke is achieved. Periodic readings should be taken to determine the change, if any, of smoke color with time. When sufficient data have been taken, the valve 27 is opened, damper 24 is closed and the smoke exhausted from the chamber. The window should be cleaned before making another test. If different smokes are to be tested, the colorimeter should be recalibrated for each color using the proper standard. The computations of the CIE chromaticity coordinates are made as follows:

Add the measured tristimulus values, X, Y, and Z, for a particular smoke. Divide each of these tristimulus values in turn by their sum, obtaining the chromaticity coordinates, x, y, and z, respectively, Thus:

$$x = X/(X+Y+Z)$$
$$y = Y/(X+Y+Z)$$
$$z = Z/(X+Y+Z)$$

To check this computation add the chromaticity coordinates. Their sum should equal $1.000 \pm 0.001$.

While we have described our apparatus in considerable detail, it is obviously susceptible of modification. We, therefore, do not desire our invention to be limited except by the scope of the appended claims.

We claim:

1. A tristimulus colorimeter comprising a source of light to be measured, three filter-phototube combinations, each of said filter-phototube combinations comprising a phototube having a photocathode and a filter closely adjacent said photocathode and between said photocathode and said source, each of said filter-phototube combinations being so selected as to give a different one of the CIE functions $\bar{x}$, $\bar{y}$, and $\bar{z}$, means for distributing light from said source uniformly to said filter-phototube combinations, each of said phototubes having a circular photocathode, the filter of the combination giving the $\bar{x}$ function being formed of two sectors, one sector being of such color and size as to have a spectral transmission corresponding to the red lobe of the $\bar{x}$ function and the other sector being of such color and size as to have a spectral transmission corresponding to the blue lobe of the $\bar{x}$ function, the center of said sectors being aligned with the center of the photocathode, said photocathode being substantially uniform circumferentially in its response, and means for indicating the output of each of said phototube.

2. A tristimulus colorimeter comprising a relatively large source of light to be measured, a lens so positioned as to collect light from said source, three phototubes having their photocathodes positioned in a plane behind said lens, a filter closely adjacent each photocathode and between said photocathode and said lens, each filter being of such color that it will produce in cooperation with its respective phototube a different one of the CIE functions $\bar{x}$, $\bar{y}$, and $\bar{z}$ the phototube giving the $\bar{x}$ function having a circular photocathode and the filter cooperating with said phototube consisting of an amber sector and a blue sector, said amber sector being of such color and size as to reproduce the red lobe of the $\bar{x}$ function and the blue sector being of such color and size as to reproduce the blue lobe of the $\bar{x}$ function, the center of said sectors being aligned with the center of the respective photocathode, said photocathode being substantially uniform circumferentially in its response, and means for indicating the output of each of said phototubes.

(References on following page)

References Cited in the file of this patent

UNITED STATES PATENTS

| | | |
|---|---|---|
| 1,971,737 | Troland | Aug. 28, 1934 |
| 1,989,748 | Frieser | Feb. 5, 1935 |
| 2,286,985 | Hanson | June 16, 1942 |
| 2,593,313 | Kamm et al. | Apr. 15, 1952 |
| 2,648,253 | Sweet | Aug. 11, 1953 |

OTHER REFERENCES

Publication by Winch et al.: Illuminating Engineering Society Transactions, vol. 2, No. 10, October 1937, pages 137–140.